Oct. 16, 1962   F. SCHAUB ETAL   3,058,513
WELDING THERMOPLASTIC BODIES TOGETHER
Filed March 22, 1960                2 Sheets-Sheet 1

INVENTORS:
FRANZ SCHAUB & RUDOLF HESSE
By Burgess, Dinklage & Sprung
ATTORNEYS

INVENTORS:
FRANZ SCHAUB + RUDOLF HESSE
By Burgess, Dinklage + Sprung
ATTORNEYS

United States Patent Office 3,058,513
Patented Oct. 16, 1962

3,058,513
WELDING THERMOPLASTIC BODIES TOGETHER
Franz Schaub, Oberhausen-Holten, and Rudolf Hesse, Oberhausen-Sterkrade, Germany, assignors to Ruhrchemie Aktiengesellschaft, Oberhausen-Holten, Germany, a corporation of Germany
Filed Mar. 22, 1960, Ser. No. 16,750
Claims priority, application Germany Mar. 24, 1959
17 Claims. (Cl. 156—502)

This invention relates to new and useful improvements in the welding of thermoplastic bodies together. More particularly, the invention relates to the friction-welding of thermoplastic pipes.

Bodies or parts of thermoplastic materials, as for example of polyvinyl chloride, polyamides, polyurethanes, polystyrene or polyethylene, may be welded together by heating the surfaces to be joined to at least their softening temperature and pressing the same together. The process is applicable to any thermoplastic material capable of being worked by welding. It may be used with especial advantage for polyethylenes of various molecular weights, as for example for polyethylenes having molecular weights of 20,000 to 1,000,000 without changing the working conditions. The heating is conventionally effected by means of an external source of heat, as for example by means of a torch, an electric heating element or the like.

It has also been suggested to supply this heat as frictional heat. The welding of thermoplastic parts by the application of frictional heat is an amazingly rapid way of obtaining full-strength welds. Friction-welding in its simplest form means generating heat at the surface by rubbing two thermoplastic parts together and quickly applying pressure. A welding temperature is reached very rapidly because of high surface of speed. Furthermore, most thermoplastic materials are relatively poor heat conductors, a factor that prevents the surface heat from being dissipated. As a result of the low heat loss and rapid generation of heat, only a minimum of energy is required to reach a surface welding temperature. This, of course, means that the cooling which follows is also accomplished in a short time.

Frictional heat, produced by rotating one of the bodies or parts to be formed in frictional contact with the other, is generally only applicable to bodies having a cylindrical shape, in connection with which one of the bodies is clamped to a rotating device, as for example the face plate of a lathe, while the other is held firmly with a slightly pinched fit and pressed against the rotating part. Due to the frictional heat evolved, the rotating part will adhere with sufficient tightness to the other part after a a short time, so that the latter will be carried along in the rotation.

This type of rotary frictional welding is, in practical operation, limited to pipes and other cylindrical bodies of a relatively small length, which may be conveniently rotated. Furthermore, this type of welding requires a lathe or other rotary machine tool, so that operation in the field is not practical. Additionally, it is not possible to obtain a predetermined rotational alignment of the welded part, as the point at which the parts will adhere and rotate together cannot be accurately predicted or controlled. For this reason, it is not possible to obtain the desired relative position, with respect to pipe nozzles, projections or bores provided on the pipes or cylindrical parts which are welded together. The rotary frictional welding process is not at all applicable in effecting the longitudinal connection of plates, rods or profiles or for making complicated or difficulty accessible connections.

To avoid the disadvantages of the rotary frictional processes, it has already been suggested to weld together two bodies by friction, with the bodies to be welded together maintained in firmly clamped positions, the end faces of the two bodies being pressed against each other (only one of said bodies being capable of any motion). There is then imparted to the body to be joined oscillatory motion until sufficient heat has been generated for a sound weld of the two bodies to be obtained. Special care has to be taken to ensure that a satisfactory clamping and preparation of the surfaces is provided for, if a rapid and satisfactory joint or weld is to be obtained.

It is an object of this invention to provide an apparatus for welding by friction, which overcomes the disadvantages associated with the rotary frictional apparatus and of the last mentioned clamping apparatus.

Another object of the invention is the provision of an apparatus for joining thermoplastic bodies and in particular pipes by welding by means of frictional heat, which may be readily assembled with a minimum of equipment and which will be failure-proof under service conditions.

Still another object of the invention is to provide a set-up which may be used for numerous applications. That is, a set-up which will lend itself to different jobs.

The invention will be more fully understood and further objects and advantages thereof will become apparent when reference is made to the more detailed description, which is to follow, and to the accompanying drawings, in which FIG. 1 is in part a diagrammatic sectional view and in part a side view of an embodiment of the welding apparatus in accordance with the invention;

Figure 1:
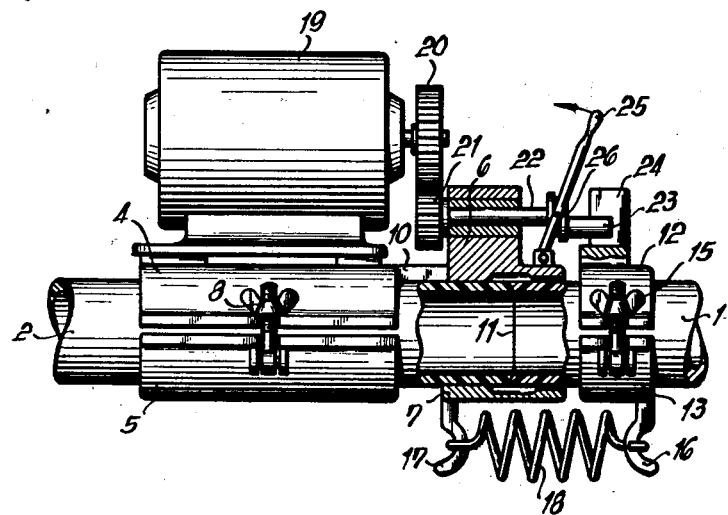
Figure 2:
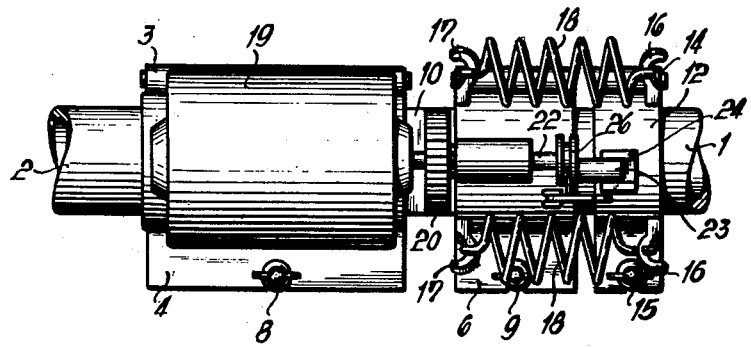
FIG. 2 is a view taken from above of the embodiment shown in FIG. 1.
Figure 3:
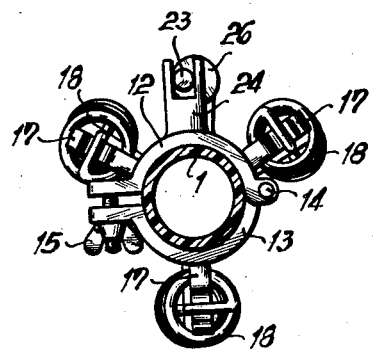
FIG. 3 is a diagrrammatic cross-section of the device in accordance with the invention.

In accordance with the invention, the apparatus for welding the thermoplastic bodies together, and in particular pipes (the term "pipes" being generically used to designate any tubular members or conduits), consists of two separate socket or clamping means for engaging the bodies to be joined in end-frictional contact. One of said socket or clamping means is mounted on the end of the fixed body, the second being adapted to be mounted on the end of the body to which oscillations are to be parted. The first of said socket or clamping means, i.e. the means arranged on the fixed body, is provided with a motor-driven eccentric drive, which engages means provided at the second socket or clamping means mounted on the end of the body to be joined. The end faces or surfaces of the bodies to be joined are maintained in end contact by means of resilient connections as for example tension springs, arranged between the two socket or clamping means. The socket or clamping means arranged on the body which is to be held in fixed position is provided at its front end with means adapted to serve as a guide for the body to be joined by welding. In this manner, an absolutely tight pressure-resistant co-axial welded joint is obtained, which is particularly suitable in the case of pipes, especially thin-walled pipes.

In accordance with the invention, the welding together of the bodies of thermoplastic material is effected by means of an apparatus which maintains the bodies, and in particular pipe sections, to be joined in frictional contact and alignment with each other at the end portions thereof, so that only the front end portions of one of the sections is capable of oscillatory motion, and imparting to that body or pipe section oscilaltory motion of sufficient amplitude to produce that amount of frictional heat required for the welding. The other body or pipe section is maintained throughout in a stationary position. When a sufficiently high oscillation drive is caused by the motor, as for example with a frequency of 10–100 cycles per second and an amplitude of 0.2–20 mm., the frictional rubbing at the contact surfaces will generate sufficient heat for a sound weld within a relatively short period of time. In general, a friction time of 20–60 seconds is sufficient.

Referring to the drawings, the ends of pipe sections 1—2, constructed of thermoplastic material, as for example polyvinyl chloride, polyamides, polyurethanes, polystyrene or polyethylene, are pressed together so as to form an annular butt joint 11. Pipe section 12 is held firmly and immovably. Pipe section 1 is held so that a rotary oscillating motion can be imparted throughout or to a sufficiently long section thereof. Pipe section 2 is held firmly by a hinged pipe clamp or socket, which consists of two halves 4—5, which can be rotated about a hinge 3, and of the socket halves or clamp devices 6—7. The sockets or clamps 4—5 and 6—7 are mounted by means of wing screws 8—9. The bore of the sockets or clamps is dimensioned so that a tight and slip-proof fit on the pipe section surfaces is obtained when the wing screws are tightened. The sockets or clamps 4—5 and 6—7 are connected by bridging means 10. The front end of the socket or clamps 6—7 projects slightly beyond the butt joint 11 of the pipe sections 1—2 and is somewhat expanded, so that the section of pipe 1 to be connected by welding can oscillate freely, but is guided so as to obtain a completely and correctly aligned co-axial pipe connection.

Mounted on pipe section 1, to which oscillations are to be imparted, is a socket or clamping device which consists of two hinged parts 12—13, which may easily be snapped or unsnapped around the pipe section about a hinge 14. The sockets or clamps 12—13 are immovably mounted on the pipe surface by means of wing screw 15.

Mounted on both of the socket or clamping devices 6—7 and 12—13 are pairs of hooks 16—17, equally spaced apart over the circumference of the sockets. A powerful spring is arranged between each pair of associated hooks 16—17. Preferably, these springs are drawsprings 18. By virtue of the springs 18 and the firmly attached clamping devices 12—13, the pipe section 1 to be welded to the pipe section 2 is maintained in a pressing relationship at the butt joint 11. The pressure at the joint may range between 2 and 40 kg./sq. cm. The end faces of the pipe sections to be welded together are preferably chamfered or beveled in the conventional manner. The driving motor, preferably an electric motor, 19 is mounted on the upper socket or clamping device half 4 by means of spur gears 20—21, and a shaft or connecting rod 22 rotates an eccentric 23. Eccentric 23 engages a prong 24, provided on the clamping device half 12, which is tightly fastened onto the surface of the pipe section 1 to be connected by the welding.

When the motor 19 is in operation, there are imparted to the pipe section 1 rotary oscillation motions. In view of the small amplitude of the oscillations and the pressure exerted by the springs 18, heat is generated by frictional rubbing at the butt joint 11 sufficient for a sound weld within a relatively short period of time.

As soon as the end faces of the pipe sections to be joined have reached the temperature at which satisfactory welding takes place, which can easily be determined by taking into consideration the material of which the pipe sections are made, the wall thicknesses and the diameter of the pipe sections, etc., the lever 25, which engages the grooved disc 26, is displaced in the direction of the arrow shown in FIG. 1. In this manner, the spur gear 21 and the eccentric 23 are displaced so that pipe section 1 will no longer oscillate. After a short lapse of time, the welding apparatus of the invention can be removed from the unitary pipe thereby formed by unscrewing the wing screws 9 and 15. If it is desired to add a further pipe section, the apparatus is mounted again at the new end of the pipe section, as now formed.

In place of the electric motor shown in the drawings, any suitable rotary driving device may be used, as for example a pneumatic motor, an internal combustion engine and even a manually operated motor driven by a hand crank through a suitable gear arrangement or driven by a clock-work which is manually wound.

Figure 4:
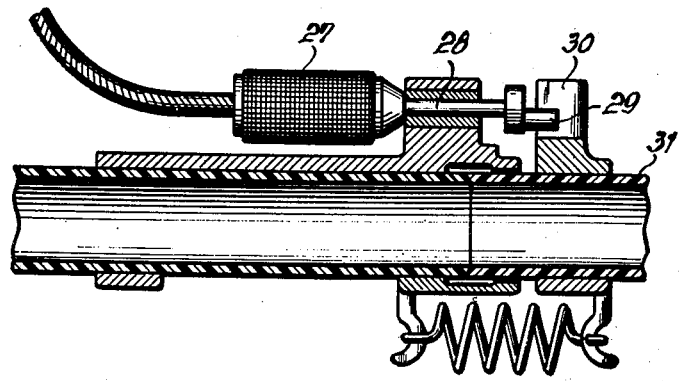
FIG. 4 depicts an embodiment of the oscillation drive in accordance with the invention.

If the motor provided with a flexible shaft is available at the site of the operation, the embodiment illustrated in FIG. 4 is advantageously used. In this instance, the flexible shaft by means of a coupling 27 is mounted on the drive shaft 28 of the eccentric 29 which, by means of a slotted strap 30, imparts oscillations to the pipe section 31 to be connected by the friction welding.

It is preferable to use the same material for both pipe sections or bodies to be welded together. However, it is also possible that one of the sections be of a relatively soft material and the other be made of a hard plastic material. Thus, for example, a pipe connection of a soft polyvinyl chloride or soft polyethylene may be made with a rigid polyvinyl chloride or rigid polyethylene.

The apparatus in accordance with the invention is easily transportable and may also be used to particular advantage in connection with the installation of pipe lines. The pipe connections required can be easily made by means of simple tools, even in narrow trenches or pipe channels, without any difficulties. In particular, the process in accordance with the invention lends itself to making additions to assemblies of buried or submerged piping, where new sections have to be added to partially or completely buried pipe lines. The apparatus in accordance with the invention is also useful for the repair of installed thermoplastic piping if, for example, a defective section must be cut out from an installed pipe system and replaced by a new section.

The apparatus in accordance with the invention also lends itself to welding together in close alignment bodies of thermoplastic materials, as for example optical lenses composed of several polished parts. Irregular shaped articles, as for example containers, that cannot be welded by rotary processes are most readily and satisfactorily welded with the apparatus in accordance with the invention.

The following example is given by way of illustration and not limitation:

EXAMPLE

The clamping means for the fixed body was mounted on the end of a partially installed pipe of polyethylene with a diameter of 33 mm. and a wall thickness of nearly 3.5 mm. The other clamping means of the device for welding was mounted on the end of another pipe of the same quality, so that the slightly beveled endfaces of both pipes were maintained in contact. The load of the spring amounted to 10 kg., so that a pressure of nearly 3 kg./cm.$^2$ was exerted at the butt joint. The eccentricity of the eccenter accounted 6 mm. The oscillation drive of the motor was caused with a frequency of 2750 cycles/minute at a power of 110 watt. The welding time amounted to nearly 40 sec. Thereafter the oscillating movement was terminated instantaneously, in order to prevent damage of the welded joint. After cooling, the pipe ends were rigidly connected.

We claim:

1. Device for welding thermoplastic bodies together, which comprises first clamping means for maintaining the two bodies of thermoplastic material to be joined in end frictional contact and in alignment with each other, said first clamping means including guide means extending beyond the point of abutting contact to serve as a guide for said body to be joined by welding, additional clamping means for engaging the body to which rotary oscillatory motions are to be imparted, resilient means connecting said additional clamping means with said clamping means engaging the body to which no rotary oscillatory motions are to be imparted under tension, means for imparting rotary oscillatory motions to one of said bodies in frictional contact with the mating end portion of the other body during said abutting contact to cause friction at the point of joining sufficient to effect welding.

2. Device for welding thermoplastic bodies together, which comprises first clamping means for maintaining the two bodies of thermoplastic material to be joined in end frictional contact and in alignment with each other, said first clamping means including guide means extending beyond the point of abutting contact to serve as a guide for said body to be joined by welding, additional clamping means for engaging the body to which rotary oscillatory motions are to be imparted, resilient means connecting said additional clamping means with said clamping means engaging the body to which no rotary oscillatory motions are to be imparted under tension, means for imparting rotary oscillatory motions to one of said bodies in frictional contact with the mating end portion of the other body mounted on said first clamping means, and means connecting said means for imparting rotary oscillatory motion with said additional clamping means engaging said body to which rotary oscillatory motion is to be imparted.

3. Device for welding thermoplastic bodies together, which comprises first socket means for maintaining two bodies of thermoplastic material to be joined in end frictional contact and in alignment with each other, said first socket means consisting of socket halves and being capable of being swung about a hinge and including guide means extending beyond the point of abutting contact to serve as a guide for said body to be joined by welding, additional socket means for engaging the body to which rotary oscillatory motions are to be imparted, resilient means connecting said additional socket means with said socket means engaging the body to which no rotary oscillatory motions are imparted under tension, means for imparting rotary oscillatory motion to one of said bodies in frictional contact with the mating end portion of the other body during said abutting contact to cause friction at the point of joining sufficient to effect welding.

4. Device for welding thermoplastic bodies together, which comprises first socket means for maintaining two bodies of thermoplastic material to be joined in end frictional contact and in alignment with each other, said first socket means consisting of socket halves and being capable of being swung about a hinge and including guide means extending beyond the point of abutting contact to serve as a guide for said body to be joined by welding, additional socket means for engaging the body to which rotary oscillatory motions are to be imparted, resilient means connecting said additional socket means with said socket means engaging the body to which no rotary oscillatory motions are imparted under tension, means for imparting rotary oscillatory motion to one of said bodies in frictional contact with the mating end portion of the other body mounted on said first socket means and means connecting said means for imparting rotary oscillatory motion with said additional socket means engaging said body to which rotary oscillatory motions are imparted.

5. Device for welding thermoplastic pipe sections together, which comprises first socket means for maintaining the two pipe sections of thermoplastic material to be joined in end frictional contact and in alignment with each other, said first socket means consisting of socket halves and being capable of being swung about a hinge and including guide means extending beyond the point of abutting contact to serve as a guide for said pipe section to be joined by welding, additional socket means for engaging the pipe section to which rotary oscillatory motions are to be imparted, resilient means connecting said additional socket means with said socket means engaging the pipe section to which no rotary oscillatory motions are imparted under tension and in co-axial alignment, means for imparting rotary oscillatory motion to one of said pipe sections in frictional contact with the mating end portion of the other pipe section during said abutting contact to cause friction at the point of joining sufficient to effect welding.

6. Device for welding thermoplastic pipe sections together, which comprises first socket means for maintaining the two pipe sections of thermoplastic material to be joined in end frictional contact and in alignment with each other, said first socket means consisting of socket halves and being capable of being swung about a hinge and including guide means extending beyond the point of abutting contact to serve as a guide for said pipe section to be joined by welding, additional socket means for engaging the pipe section to which rotary oscillatory motions are to be imparted, resilient means connecting said additional socket means with said socket means engaging the pipe section to which no rotary oscillatory motions are imparted under tension and in co-axial alignment, means for imparting rotary oscillatory motion to one of said pipe sections in frictional contact with the mating end portion of the other pipe section, means on said first socket means and means connecting said means for imparting rotary oscillatory motions with said additional socket means and engaging said pipe section to which rotary oscillatory motions are imparted.

7. Device according to claim 6, in which the front end of said first socket means extending beyond the abutting contact point of said pipe ends and serving as guide means for the pipe sections to be joined by welding is provided with an enlarged annular bore.

8. Device according to claim 6, in which said resilient means connecting said first and additional socket means are draw-springs extending parallel to the axis of said pipe sections.

9. Device according to claim 6, in which said additional socket means is provided with prong means for engaging pin means for connecting said oscillating means with said additional socket means.

10. Device according to claim 6, in which said means for imparting rotary oscillatory motions to one of said pipe sections is an electric motor.

11. Device according to claim 10, in which said electric motor drives an eccentric which engages with prong means mounted on said additional socket means.

12. Device according to claim 11, in which said electric motor by means of spur gears and a shaft drives an eccentric which engages with prong means mounted on said additional socket means.

13. Device according to claim 6, in which means are provided for disengaging said means connecting said additional socket means with said means for imparting rotary oscillatory motion.

14. Device according to claim 6, in which said means for imparting rotary oscillatory motions to one of said pipe sections is a motor provided with a flexible shaft.

15. Device according to claim 14, in which said flexible shaft is by coupling means mounted on a drive shaft of an eccentric which engages with prong means mounted on said additional socket means.

16. Device according to claim 15, in which said means for engaging said additional socket means are slotted strap means.

17. Device for welding thermoplastic bodies together, which comprises means for positioning in abutting contact under tension the ends of the respective bodies to be joined, and means for imparting rotary oscillatory motions to one of said bodies with respect to the other during said abutting contact to cause friction at the point of joining sufficient to effect the welding together of said bodies, said positioning means including guide means extending substantially across the point of joining between the said two bodies to be joined.

References Cited in the file of this patent
UNITED STATES PATENTS

| | | |
|---|---|---|
| 1,627,288 | Kurkowski | May 3, 1927 |
| 3,002,871 | Tramm et al. | Oct. 3, 1961 |

OTHER REFERENCES

Modern Plastics, November 1945, pages 142–145, the article "Fabricating With Frictional Heat," by Robert N. Freres.

UNITED STATES PATENT OFFICE
CERTIFICATE OF CORRECTION

Patent No. 3,058,513                                October 16, 1962

Franz Schaub et al.

It is hereby certified that error appears in the above numbered patent requiring correction and that the said Letters Patent should read as corrected below.

Column 1, line 52, strike out "a"; column 2, line 6, for "difficulty" read -- difficultly --; line 54, for "parted" read -- imparted --; column 3, line 12, for "oscilaltory" read -- oscillatory --; line 27, for "Pipe section 12" read -- Pipe section 2 --.

Signed and sealed this 10th day of September 1963.

(SEA)
Attest:

ERNEST W. SWIDER
Attesting Officer

DAVID L. LADD
Commissioner of Patents